(12) United States Patent
Layton et al.

(10) Patent No.: US 11,263,249 B2
(45) Date of Patent: Mar. 1, 2022

(54) ENHANCED MULTI-WORKSPACE CHATBOT

(71) Applicant: Kyndryl, Inc., New York, NY (US)

(72) Inventors: Beth A. Layton, Shrewsbury, NJ (US); Thomas M. Reeves, Tampa, FL (US); Brian J. Snitzer, Lancaster, PA (US); Michael Treadway, Keller, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/428,300

(22) Filed: May 31, 2019

(65) Prior Publication Data

US 2020/0380020 A1    Dec. 3, 2020

(51) Int. Cl.

| | | |
|---|---|---|
| G06F 16/332 | (2019.01) | |
| G06F 16/9535 | (2019.01) | |
| H04L 12/58 | (2006.01) | |
| G06F 16/338 | (2019.01) | |
| G06F 16/9538 | (2019.01) | |
| G06N 3/00 | (2006.01) | |
| G06N 5/04 | (2006.01) | |
| H04L 51/02 | (2022.01) | |

(52) U.S. Cl.
CPC ........ *G06F 16/3329* (2019.01); *G06F 16/338* (2019.01); *G06F 16/9535* (2019.01); *G06F 16/9538* (2019.01); *G06N 3/006* (2013.01); *G06N 5/04* (2013.01); *H04L 51/02* (2013.01)

(58) Field of Classification Search
CPC ............... G06F 16/3329; G06F 16/338; G06F 16/9535; G06F 16/9538; G06N 3/006; G06N 5/04; H04L 51/02
See application file for complete search history.

(56) References Cited

U.S. PATENT DOCUMENTS

| | | |
|---|---|---|
| 9,009,085 B2 | 4/2015 | Boyle et al. |
| 10,148,600 B1 | 12/2018 | White et al. |
| 10,257,126 B2 * | 4/2019 | Gibbs .................. H04L 51/063 |
| 10,381,006 B1 * | 8/2019 | Eriksson ................ G06N 5/043 |
| 10,546,001 B1 * | 1/2020 | Nguyen .............. G06F 16/3344 |

(Continued)

FOREIGN PATENT DOCUMENTS

CN    103390047 A    11/2013

*Primary Examiner* — James T Tsai
(74) *Attorney, Agent, or Firm* — Tutunjian & Bitetto, P.C.; Erik Swanson

(57) ABSTRACT

Methods, systems and computer program products are described herein that provided context to user queries to a chat bot. In one embodiment, the method may include receiving a user query at a chat bot. The chat bot is communicating with a system providing conversation interaction with the user. The chat bot accessing a user profile being initiated by the user. The user can revoke the permission to the system for creating and/or using a user profile at any time. In some embodiments, the user profile includes a query history and profile information about the user that correlates keywords to context. The chat bot weighs query keywords for comparison with the keywords of the user profile that are correlated to context. The chat bot interacts with the user using the context correlated to the user in accordance with the weight of the query keywords matched to the keywords of the user profile that are correlated to the context.

20 Claims, 8 Drawing Sheets

(56) References Cited

U.S. PATENT DOCUMENTS

| | | | |
|---|---|---|---|
| 2011/0106807 A1* | 5/2011 | Srihari | G06F 16/288 |
| | | | 707/739 |
| 2011/0106829 A1* | 5/2011 | Pradhan | G06F 16/335 |
| | | | 707/765 |
| 2014/0236934 A1 | 8/2014 | Boyle et al. | |
| 2014/0279050 A1 | 9/2014 | Makar et al. | |
| 2015/0121216 A1* | 4/2015 | Brown | G06N 3/008 |
| | | | 715/707 |
| 2015/0149372 A1* | 5/2015 | Morimoto | G06F 16/93 |
| | | | 705/311 |
| 2018/0007099 A1* | 1/2018 | Ein-Gil | G06F 9/468 |
| 2018/0137856 A1* | 5/2018 | Gilbert | G06F 3/167 |
| 2018/0246938 A1* | 8/2018 | Kasravi | G06Q 50/01 |
| 2018/0268309 A1 | 9/2018 | Childress et al. | |
| 2018/0365567 A1 | 12/2018 | Kolavennu et al. | |
| 2019/0155617 A1* | 5/2019 | Buchanan | G06F 9/4451 |
| 2019/0205382 A1* | 7/2019 | Raux | G06F 40/30 |
| 2019/0215282 A1* | 7/2019 | Briggs | G06N 3/006 |
| 2020/0265842 A1* | 8/2020 | Singh | G10L 17/00 |
| 2020/0302263 A1* | 9/2020 | Douek | G06N 5/04 |
| 2021/0173680 A1* | 6/2021 | Jung | G06N 20/00 |

\* cited by examiner

ENHANCED MULTI-WORKSPACE CHATBOT

BACKGROUND

The present disclosure generally relates to artificial intelligence, and more particularly to chatbots.

A chatbot is an artificial intelligence (AI) software that can simulate a conversation (or a chat) with a user in natural language through messaging applications, websites, mobile apps or through the telephone. Chatbot applications can streamline interactions between people and services, enhancing customer experience. At the same time, they offer can companies' opportunities to improve the customers engagement process and operational efficiency by reducing the cost of customer service.

SUMMARY

In accordance with an embodiment of the present invention, a method, system and computer program product is described herein that provided context to user queries to a chat bot. In one embodiment, the method may include receiving a user query at a chat bot. The chat bot is communicating with a system providing conversation interaction with the user. The chat bot accessing a user profile being initiated by the user. The user can revoke the permission to the system for creating and/or using a user profile at any time. In some embodiments, the user profile includes a query history and profile information about the user that correlates keywords to context. The chat bot weighs query keywords for comparison with the keywords of the user profile that are correlated to context. The chat bot interacts with the user using the context correlated to the user in accordance with the weight of the query keywords matched to the keywords of the user profile that are correlated to the context.

In one embodiment, a computer implemented method is described herein for providing context for user queries to a chat bot. In one embodiment, the method includes registering a user to a context recognition system that collects data to provide a user profile, wherein the user can revoke permission to the context recognition system for creating or using the user profile at any time; and creating a user profile with the context recognition system from a query history and profile information about the user that correlates keywords to context. In a following step, the method includes receiving a user query at a chat bot providing a conversation interaction with the user. The chat bot is communicating with the context recognition system, wherein terms from the query are matched to keywords that are correlated to context by the context recognition system, the context of the query being provided from the context recognition system to the chat bot. The method further includes answering the user query with the chat bot, wherein chat bot employs the context provided by the context recognition system to answer the user query.

In another aspect, the present disclosure provides a system for providing context for user queries to a chat bot. In one embodiment, the system includes a user registration interface for registering a user to a context recognition system that collects data to provide a user profile. The user can revoke permission to the context recognition system for creating or using the user profile at any time. In some embodiments, the system further includes user profile calculator for creating a user profile with the context recognition system from a query history and profile information about the user that correlates keywords to context. The system can also include an applicator of the user profiler for receiving a user query at a chat bot providing a conversation interaction with the user, wherein the applicator includes a hardware processor for executing instructions to provide that terms from the query are matched to keywords that are correlated to context by the context recognition system. In one embodiment, the system also includes a transmitter for sending the context provided by the applicator to the chat bot for answering the user query, wherein chat bot employs the context provided by the context recognition system to answer the user query.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
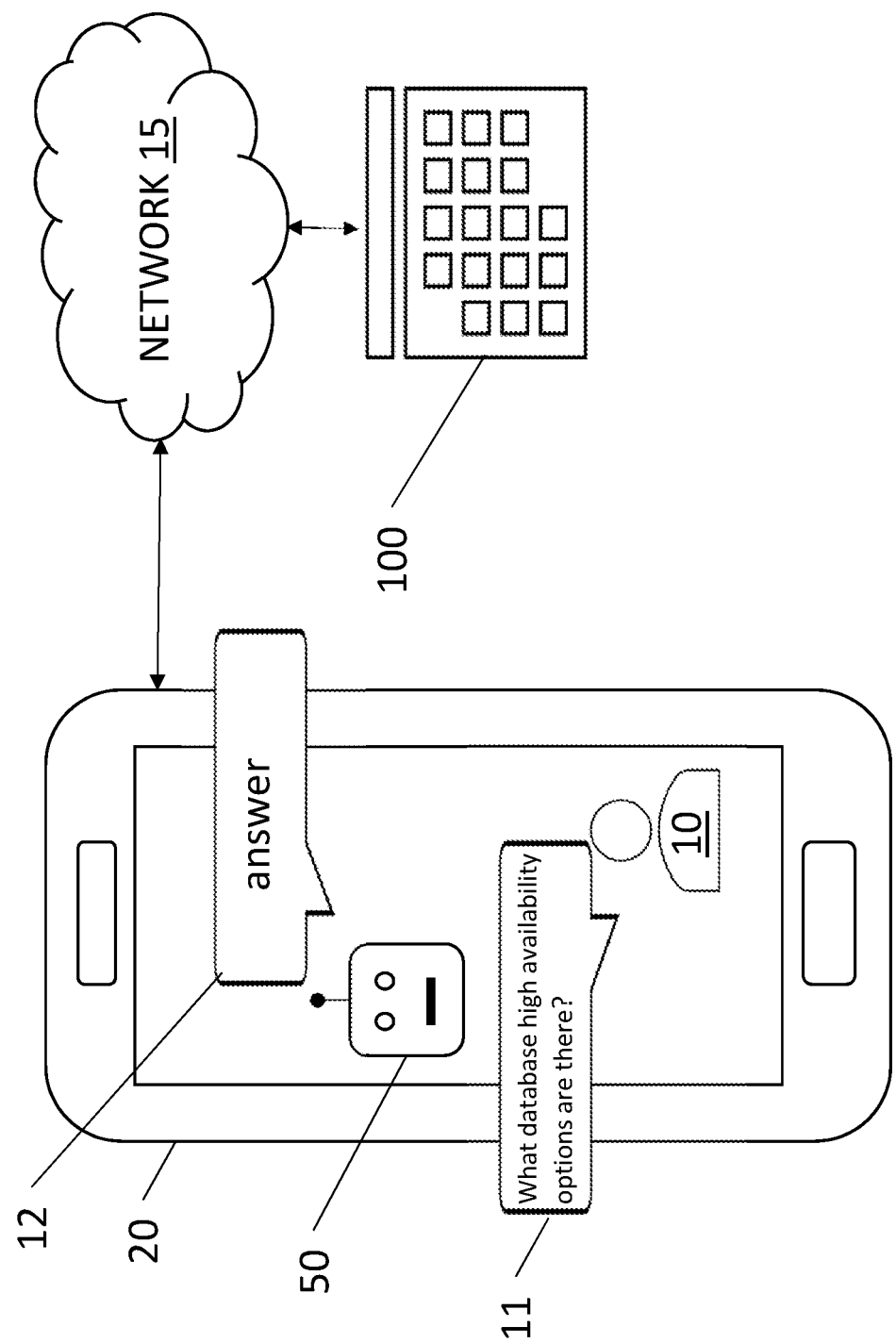
FIG. 1 is a diagram illustrating an example environment for an interaction between a chat bot and a user employing a system for analyzing context of user information to assist the chat bot in answering the user query, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the disclosure provides methods, systems and computer program products that provide artificial intelligence systems as chatbots. Chatbots have emerged as an interface to allow users to query bodies of knowledge using conversational, human-centric communications styles. A "chatbot" (also known as a spy, conversational bot, chatterbot, interactive agent, conversational interface, conversational AI, talkbot or artificial spy entity) is an apparatus, a computer program or a form of artificial intelligence or combination thereof that conducts a conversation via auditory or textual methods. Programs are often designed to simulate how a human would behave as a conversational partner. Chat bots can be applied to customer service or information acquisition. Some chatbots use natural language processing systems. In other examples, the chatbot can scan for keywords within the input, then pull a reply with the most matching keywords, or the most similar wording pattern, from a database.

In complex environments, chatbots may need to navigate multiple distinct bodies of knowledge. In some instances, when a chatbot receives a query, before giving an answer, the first task for a chatbot is to determine which category of information the query is about. It has been determined that defining the category of information that is relevant to the query by the user to the chat bot can result in repetitive and rudimentary user interactions, where a user must provide context before they are able to ask the question that the user intends to be answered by the chatbot.

For example, if a user asks a question to the chatbot, such as "what storage options are available for the database?", this question can be vague. In this example, in order for a chatbot to comprehend, which body of knowledge to search, the chat bot has to understand the context under which the question is being asked. In some examples, to determine the proper context, the chat bot may ask the user a series of qualifying questions in order to understand which body of knowledge to search. For example, the chat box may ask the user, "are you referring to Oracle applications?". In this example, if the user says "no", then the chat bot can ask, "are you referring to SAP applications?", etc.

The process of attempting to qualify the user in order to select the appropriate body of knowledge can be a frustrating experience for the user. The methods, systems and computer program products that are described herein improve the experience of an interaction with a multi-workspace chat bot by providing additional context about what information the user is likely searching for. We provide a method and system that analyzes context about the user to determine the best fit body of knowledge. In some embodiments, this information about the user includes elements such as their communication history (via short message service (SMS) text messages or other tools), their position within the organization (via org charts or similar tools), and their network of peers (via social media). By analyzing this context about the user, the methods, systems and computer products described herein are able to identify a score for a set of associated keywords, and to recommend a likely corpus of knowledge for a given user. The term "corpus" denotes a collection of recorded facts. In this case, the corpus is tied to a user, and includes facts that help to designate context to the chat bot.

The corpus selection process can include the user's question being sent to a service, such as a cloud service that employs an artificial intelligence (AI) virtual assistant (VA), in order to determine which corpus of knowledge to query from. The top weighted keywords identified from the user's profile can be appended to the question in order to give the service, extra context.

In some embodiments, the methods, systems and computer program products that are described herein further incorporates a sleep keyword to allow the user to bypass any profiling or learning algorithms, so that the and to interface with the chatbot directly. If the user wants to bypass this functionality (perhaps they're asking a question that is outside of their normal work area), a pre-configured phrase such as ("As someone else", or "As another person", etc.) can be detected and the user's profile and feedback loop is ignored.

In some embodiments, the methods, systems and computer program products that are described herein additionally include a feedback loop that reviews the user's experience and updates their profile based on whether they are successful or not in querying the chatbot corpus. This enables the system to learn and correct any errors that may arise from unexpected input.

In some embodiments, the methods, systems and computer program products that are described herein provide a method for obtaining a user profile from various available data sources, and a model for representing and processing the profile in a chat bot interaction with a user for providing context to questions asked by the user. The methods, systems and computer program products also provide a method of short circuiting the use of a user profile during the user and chat box interaction by optionally allowing the user to disable the profile use function by saying a "sleep" keyword. The methods, systems and computer program products can also employ a feedback loop that is used to adjust the user profile. The methods, systems and computer program products are now described with greater detail with reference to FIGS. 1-8.

Figure 2:
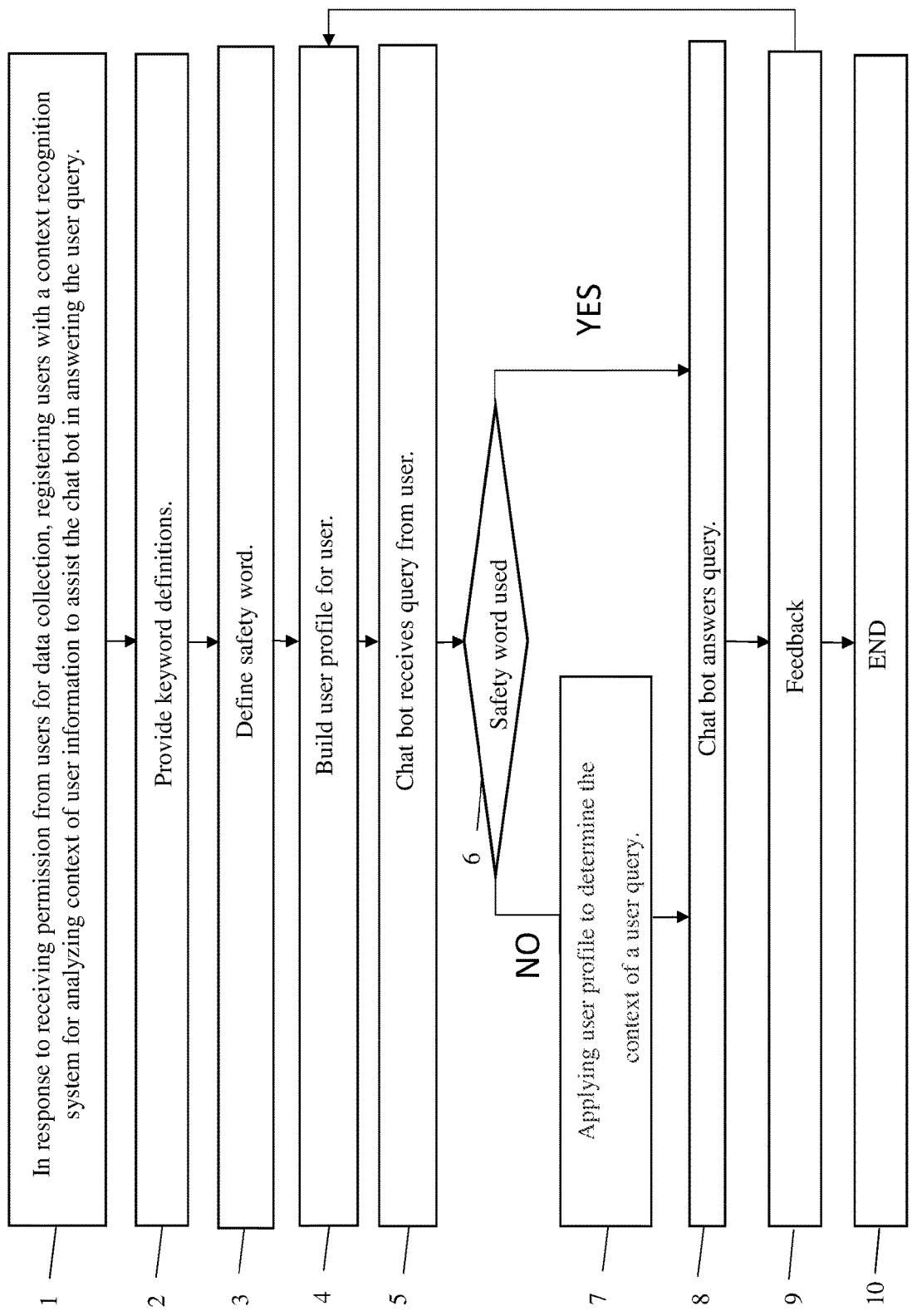
FIG. 2 is a block/flow diagram showing a method for providing context to a query made by a user to a chat bot, in accordance with an embodiment of the present invention.
Figure 3:
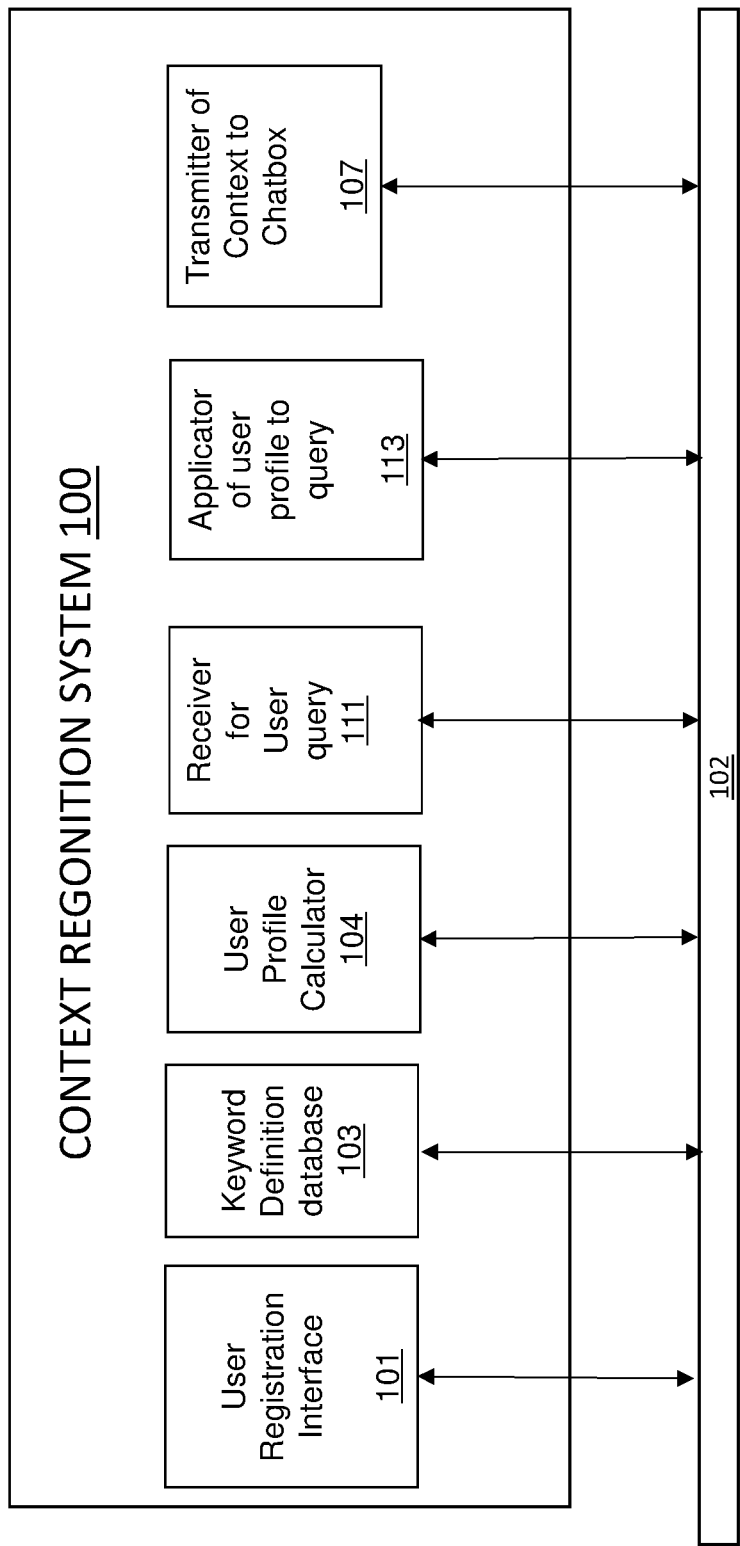
FIG. 3 is a block diagram illustrating a system for providing context to a query made by a user to a chat bot, in accordance with one embodiment of the present disclosure.

FIG. 1 is a diagram illustrating an example environment for an interaction between a chat bot 50 and a user 10 employing a system for analyzing context of user information to assist the chat bot in answering the user query (hereafter referred to as "context recognition system 100"). FIG. 2 is a block/flow diagram showing a method for providing context to a query made by a user to a chat bot 50. FIG. 3 is a block diagram illustrating a system for providing context to a query made by a user to a chat bot 50.

The chat bot 50 may be an application that is being run on a computer device 20. The computing device 20 may be selected from a mobile computing device, laptop/notebook computer, sub-notebook computer, a tablet, phablet computer; a mobile phone, a smartphone; a personal digital assistant (PDA), a portable media player (PMP), a cellular handset; a handheld gaming device, a gaming platform, a wearable computing device, a body-borne computing device, a smartwatch, smart glasses, smart headgear, and a combination thereof.

It is further noted that although the following description and the supplied figures illustrate a chat bot 50 being employed on a mobile device, e.g., using a text base interaction with a user, this is not the only embodiment of the present disclosure. The interaction between the user 10 and the chat bot 50 may be across a platform using a voice recognition system (VRS). As used herein, a "voice response system (VRS)" is a computer interface which responds to voice commands, instead of responding to inputs from a mouse or a keystroke. In some examples, the voice response system employs a type of speech synthesis where sentences are organized by concatenating pre-recorded words saved in a database. The voice response system (VRS) can be provided by a virtual assistant. The term "virtual assistant" denotes a software agent that can perform tasks or services for an individual based on verbal commands. Some virtual assistants are able to interpret human speech and respond via synthesized voices.

The computing device 20 which the user 10 interacts with to query the chat bot 50 may be connected to the context recognition system 100 over a network 14. One or more portions of the network 14 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 14 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an example, assigning context to user queries 11 to a chat bot 50 may include obtaining a user profile from various available data sources. In some embodiments, the method may begin at block 1, which can include registering users with the system for analyzing context of user information to assist the chat bot in answering the user query (hereafter referred to as "context recognition system 100"). The method may begin with in response to receiving permission from a user 10 for data collection, registering users with the context recognition system 100, which provides the context of a user query 11 to assist the chat bot 50 in answering the user query without requiring that the chat bot 50 ask the user 10 a number of qualifying questions to determine the context of the query 11 through requests to the user directly.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The context recognition system 100 may include a user registration interface 101. The user registration interface 101 may include a transceiver for receiving and second signals for commands related to user registration. The user registration interface 101 may also include a memory module for saving user registration information. The memory module of the user registration interface 101 may be any type of hardware memory.

Before receiving and answering queries from the user to the chat bot 50, the system 100 creates a user profile that is used to provide context to the chat bot 50 of the query 11 that the user makes to the chat bot 50.

For example, a user 10 may ask a question, i.e., query, to the chat bot 50, such as "what database high availability options are there?". This is an example of a query 11 that can have multiple domains, in which the domains can be different types of search areas for the subject of the query. In this example, there are a number of different types of databases. Without the present context recognition system 100, in order for the chat bot 50 to determine the context of the query 11, the chat bot 50 would ask questions back to the user 10, such as "are you interested in SAP databases, Microsoft databases, DB2 databases or something else?". The term "context" means what category or class of a term to be searched in the query, when the term can be applicable to multiple categories or classes. By employing the context recognition system 100, the methods, systems and computer program products described herein can determine the context of a query without asking qualifying questions from the user, such as in the example above.

For example, the context recognition system 100 of the present disclosure can recognize that the user who made the query 11, e.g., "what database high availability options are there?" reports to a team that focuses on SAP solutioning, and that they have recently communicated in a text based communication system, such as SLS, using keywords associated with SAP (e.g., "HANA, NetWeaver, ECC"). The system can also note that the user has a social network that includes a high degree of other users of the system who are already flagged as being associated with the SAP corpus of knowledge. Using this information, the context recognition system 100 can provide the context of the query 11 to the chat bot 50 without have to ask the user qualifying questions. It is noted that this is only one example of an application for the context recognition system. Other applications are also suitable so long as the application can be applied to the following described methods and systems.

In one embodiment, before the context recognition system 100 can understand what to look for in determining a context for a query 11, the system 100 is provided a set of keyword definitions, at block 2 of the method depicted in FIG. 2. The keyword definitions are used to build a user profile, in which the user profile is applied by the system to determine the context of a query 11 by the user having the specific user profile. The keywords can be considered as HTML meta-tags used by search engines. The initial set of keywords is defined up front.

Referring to FIG. 3, the context recognition system 100 may include a keyword definition database 103 for storing the initial set of keywords for building the user profile associated to each user 10.

Referring to FIG. 2, at block 3, the method may include defining a "sleep" word. The sleep word may be employed by the user 10 to turn the context recognition system 100 to an OFF setting. The sleep word can be entered to a chat bot 50 by typing text, or in some instances by voice messages.

Figure 4:
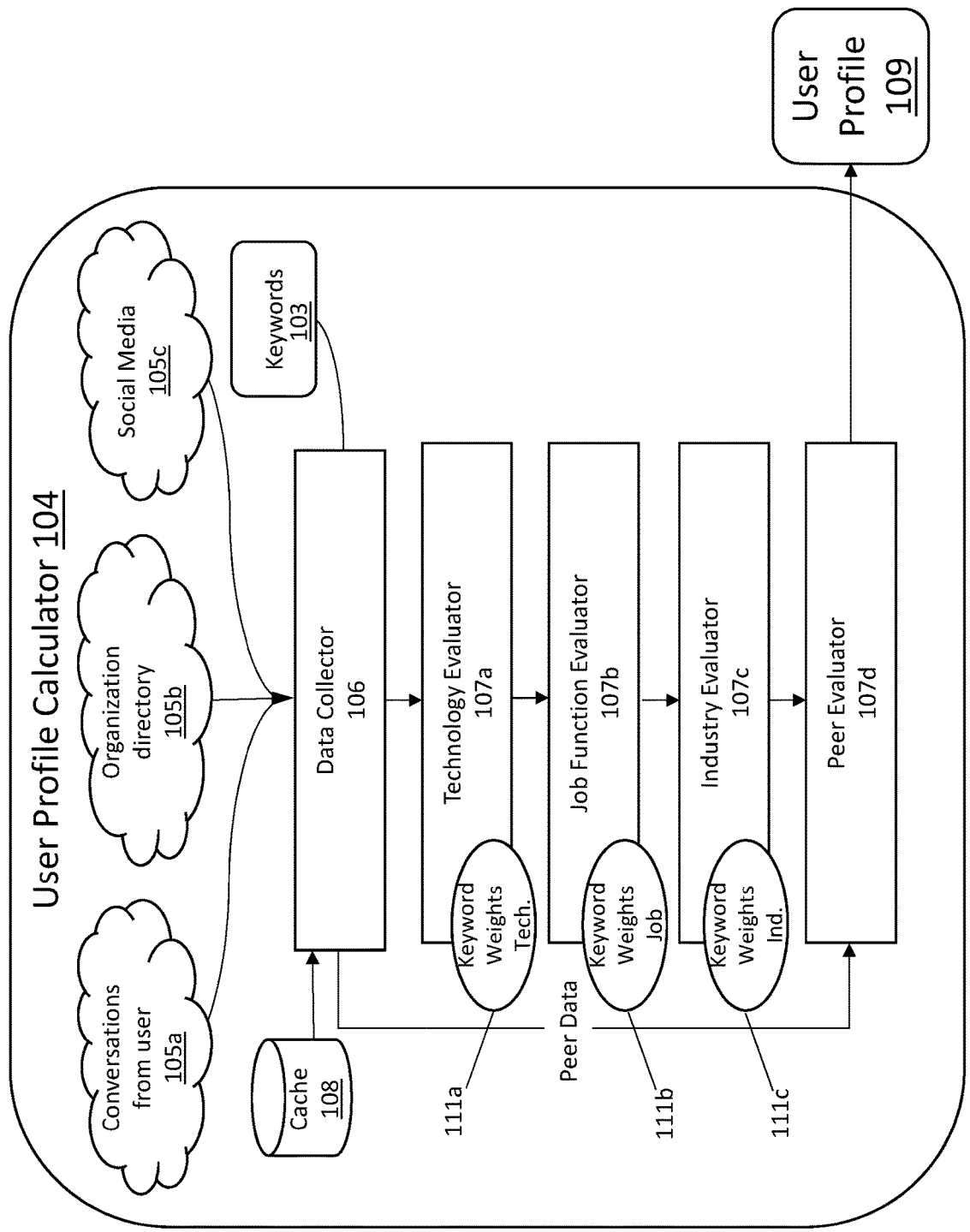
FIG. 4 is a block diagram of a user profile calculator for the system that is depicted in FIG. 3.
Figure 5:
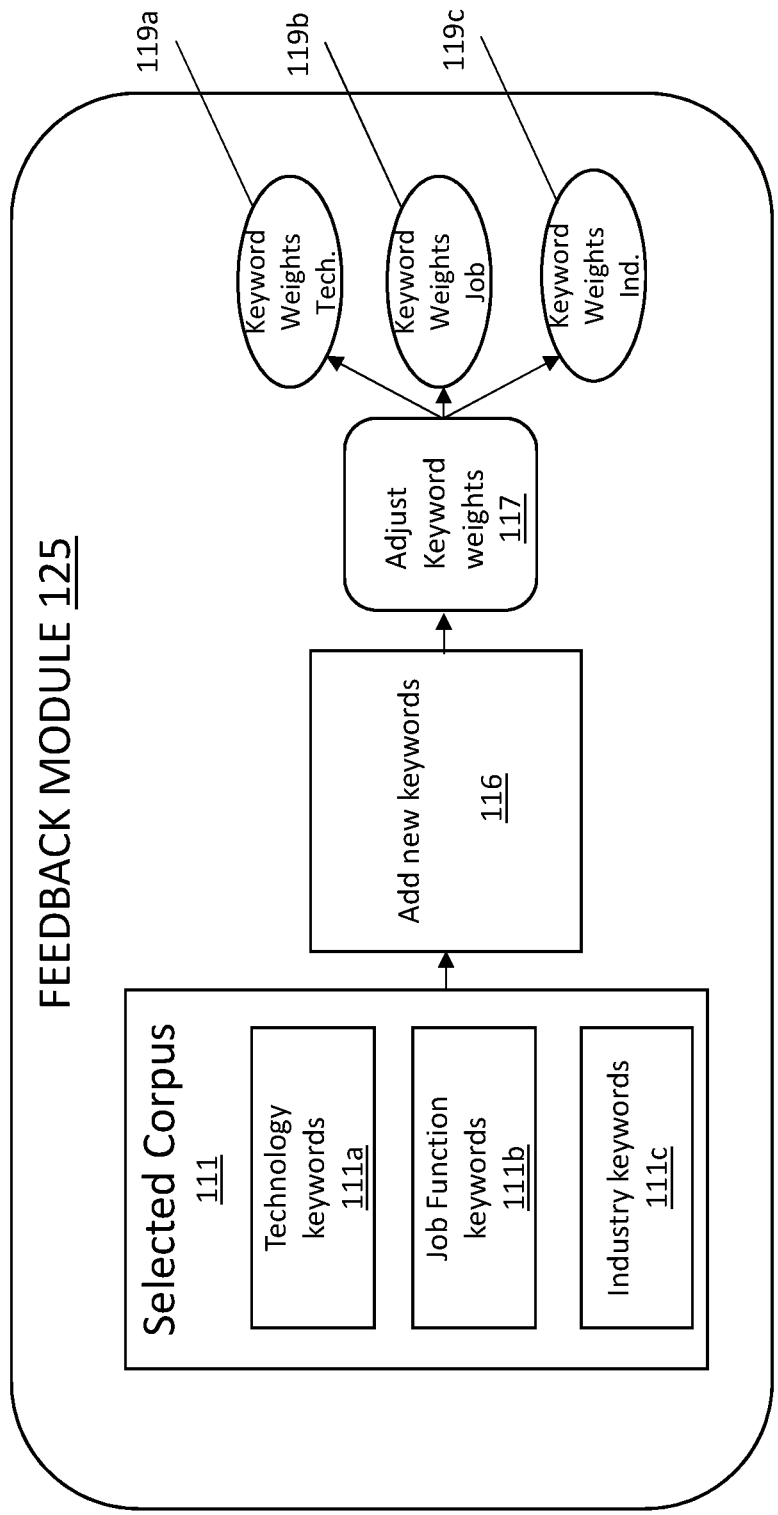
FIG. 5 is a block diagram illustrating a system that can incorporate the system depicted in FIG. 3 for performing a method for controlling a secondary system with a primary system for taking commands, in accordance with one embodiment of the present disclosure.

The method may continue with block 4, which includes building a user profile. In some embodiments, upon interacting with the user 10 for the first time, or perhaps upon interacting with the user 10 on a periodic basis, the user's information is collected and fed into a processing chain to provide the user profile. FIG. 4 is a block diagram of a user profile calculator for the system that is depicted in FIG. 3.

The user profile calculator may include a data collector 106, which collects data from a registered user from a number of data feeds 105a, 105b, 105c. In some embodiments, the data feeds may include a text based communication 105a, such as SMS texting; an organizational directory 105b; a social media web page based communication 105c; or a combination thereof. The data collector 106 examines and can search the text based communications, such as SMS conversations, and catalogs that are associated therewith. The searching can include the keyword definitions from the keyword definition database 103. SMS, or short message service, is a mobile text that can be sent peer-to-peer (like a standard text message) or from a mobile messaging service provider (a marketing message). The text based communication 105a data feed is not limited to only this type of text message. In some examples, the text based communication 105a data feed may include in-app messaging or push notifications. The data collector 106 may also examine the organization directory 105b and can record from the organizational directory 105b the job title, department and other related information for the user 10. The data collector 106 may also examine the data feed for the social media 105c for the user 10 that is registered, and catalogs keywords used by the user 10 in social media. In cataloging the keywords from the social media data feed 105c, the data collector 106 may employ the keyword definitions from the keyword definition database 103. The data collection 106 may store all the data in a form of memory, such as hardware memory, e.g., cache.

Still referring to FIG. 3, the data collected by the data collector 10 is then analyzed by a number of evaluators, e.g., technology evaluator 107a, job function evaluator 107b, industry function evaluator 107c, social media evaluator, peer evaluator 107d, and combinations thereof. Each of these evaluators may include a hardware memory including instructions to be executed by a hardware processor for providing the following described functions.

The technology evaluator 107a contributes profile data to the type of technology that the user 10 is associated with, e.g., software, medicine, law, entertainment, etc.

The job function evaluator 107b contributes profile data to the type of job that the user 10 is associated with, e.g., programmer, doctor, lawyer, singer etc. The industry function evaluator 107c contributes profile data to the type of function that the user 10 is associated with, e.g., game design, surgeon, prosecutor, back up vocals etc.

In some embodiments, the technology evaluator 107a calculates a score for each keyword pulled from the data collected by the data collector 106 based on its weight for that keyword, and the frequency of the keyword based on text message conversations and social media. As depicted in FIG. 4, the score calculated by the technology evaluator passes the catalog data down to the next evaluator, which in the depicted example is the job function evaluator 107b.

The job function evaluator 107b calculates a score for each keyword pulled from the data collected by the data collector 106 based on its weight for that keyword, and the frequency of the keyword in the organization catalog. The job function evaluator 107b passes the catalog data down to the next evaluator, which is this example is the industry function evaluator 107c.

The industry function evaluator 107c calculates a score for each keyword based on its weight for that keyword, and the frequency of the keyword in the social media data. The industry function evaluator can pass the catalog data down to the next evaluator, which can be the peer evaluator 107d.

In some embodiments, the peer evaluator 107d examines catalog data to identify peers and uses a weighted average of those peers to determine the keyword scores.

The keyword scores following the analysis of the peer evaluator 107d, e.g., output from the peer evaluator, may provide the user profile 109 with the keywords and their weights for each of the 4 areas, e.g., technology, job function, industry, peers and a combination thereof.

Referring back to FIG. 2, in a following process step, the method may continue to block 5, which includes the system 100 receiving a query 11 from the user 10 to the chat bot 50. The query 11 may be any question asked by the user 10 to the chat bot 50. The query 11 may be in text, or the query 11 may be by voice command. The context recognition system 100 may include a transceiver, i.e., receiver for query 111, to receive the information regarding the query from the user 10 to the chat bot 50, as depicted in FIG. 4.

Referring to FIG. 2, at decision block 6, the system 100 determines whether the query 11 includes a safety word. In the embodiments, in which the query 11 does not include the safety word, the process flow may extend to bock 7. To determine whether a safety word is being employed in the query, the context recognition system 100 compares the terms in the query 11 to the terms that have been defined in block 3 of the process flow. In some embodiments, the system 100 may employ, natural language understanding (NLU)

Block 7 is the application of the user profile 109 in determining the context of the query 11. The user profile 109 may be applied to the query 11 by the user profile applicator identified by reference number 113 for the context recognition system 100 that is depicted in FIG. 4. In some embodiments, the user profile applicator 113 can perform context enrichment given the highest weighted keywords from the four areas. This portion of the invention is tunable and how much weight is given to each area can be tweaked. The highest weighted keywords are added to the user's question as extra context.

In some embodiments, an initial set of keywords are seeded in the system along with a set of initial values for the weights. When evaluating the user profile and looking at the keyword weights, some keywords from the "Job Function" area of the profile may exist along some from the "Technology" area of the profile. Instead of deciding to take the highest weighted keywords overall, in response to user input, the context recognition system 100 can tune the user profile by giving more preference a particular type of keywords, such as "Job Function" keywords or "Technology" keywords.

Determine the highest weighted keywords can be threshold based, or simply just "top x keywords" based.

Referring back to FIG. 2, in the embodiments, in which the query 11 does include a safe word, the method may bypass the steps of applying the user profile 109 to the query 11.

At block 8, the chat bot 50 may provide an answer 12 to the query 11. For example, the context recognition system 100 may send the query to a virtual assistant that employs artificial intelligence to answer the query 11. Referring to FIG. 4, to provide this function, the context recognition system 100 may include a transmitter for context to chat bot 107.

Artificial intelligence (AI) is the simulation of human intelligence processes by machines, especially computer systems. These processes include learning (the acquisition of information and rules for using the information), reasoning (using rules to reach approximate or definite conclusions) and self-correction. The term "virtual assistant" denotes a software agent that can perform tasks or services for an individual based on user commands.

In the embodiments, in which the query 11 did not include a safety word, the transmitter to the chat hot 107 does not include the context that is determined using blocks 1-7 of the method described with reference to FIG. 2. In the embodiments, in which the query 11 did include a safety word, the transmitter to the chat bot 107 does include the context that is determined using blocks 1-7 of the method described with reference to FIG. 2. The virtual assistant, e.g., chatbot 50, will determine best fit workspace to handle the user's query 11 and provide an answer 12.

Figure 6:
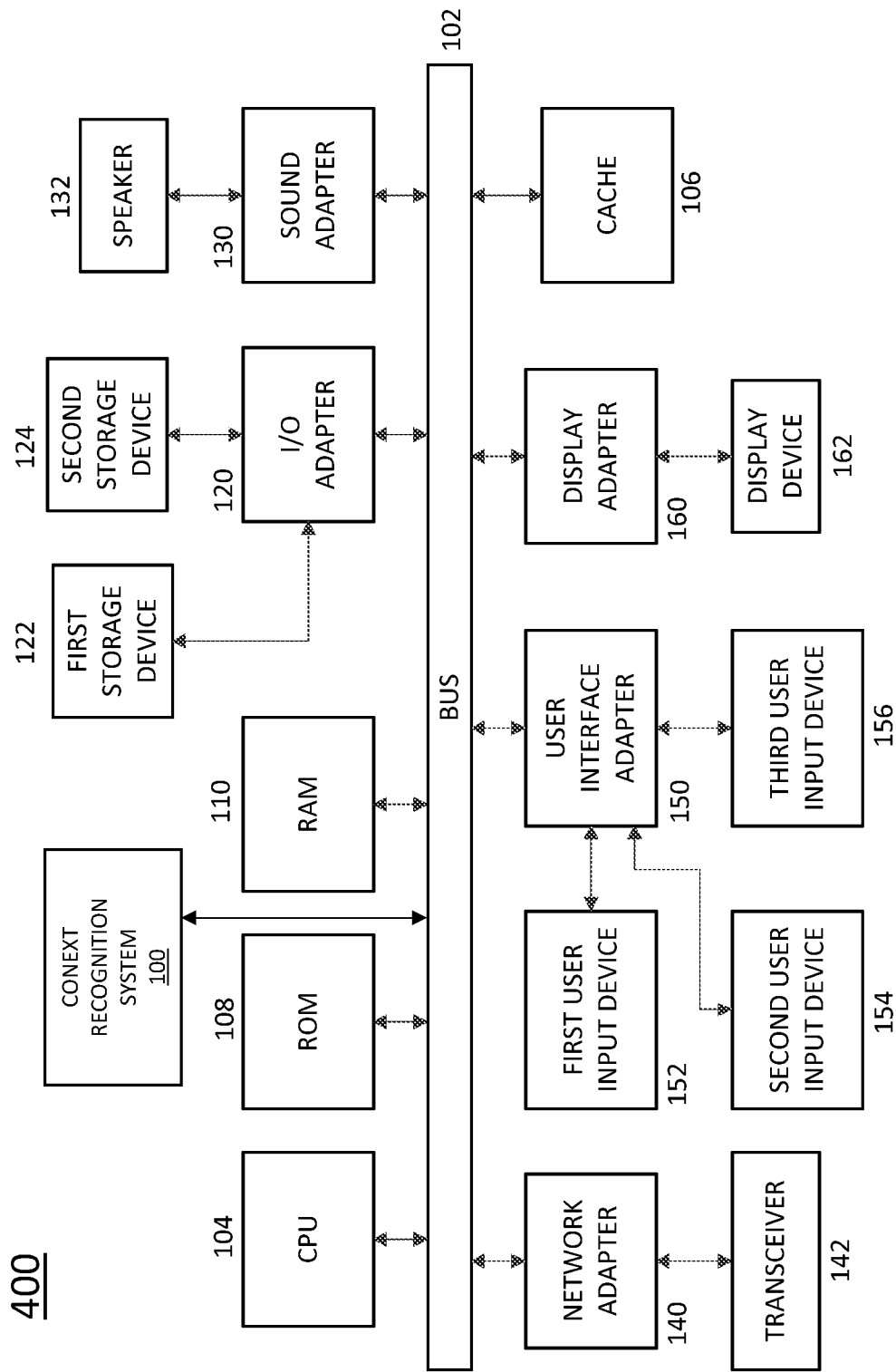
FIG. 6 is a block diagram illustrating a feedback module, in accordance with one embodiment of the present disclosure.
Figure 7:
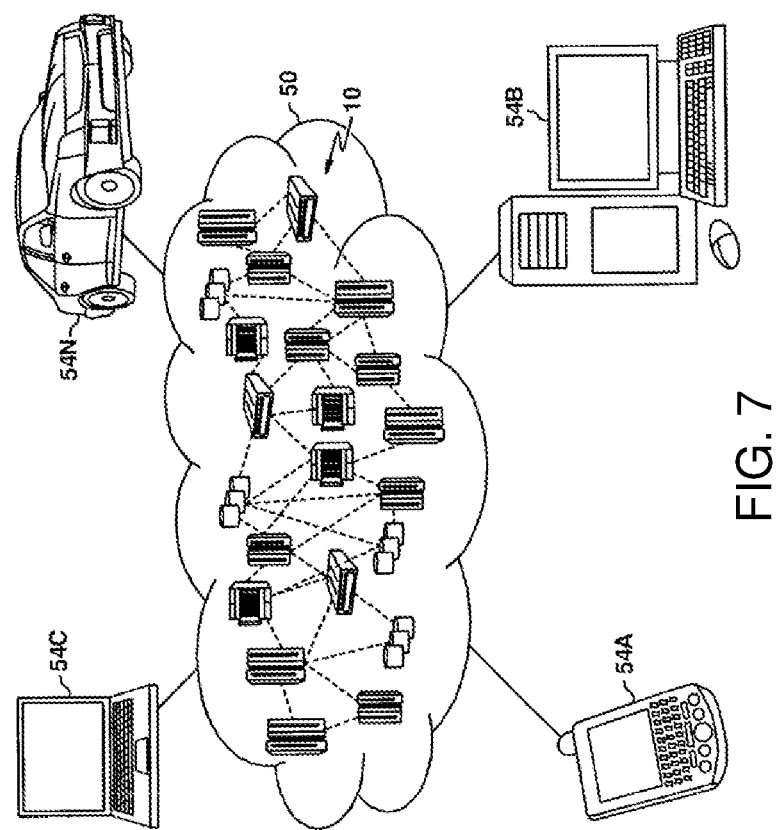
FIG. 7 depicts a cloud computing environment according to an embodiment of the present disclosure.
Figure 8:
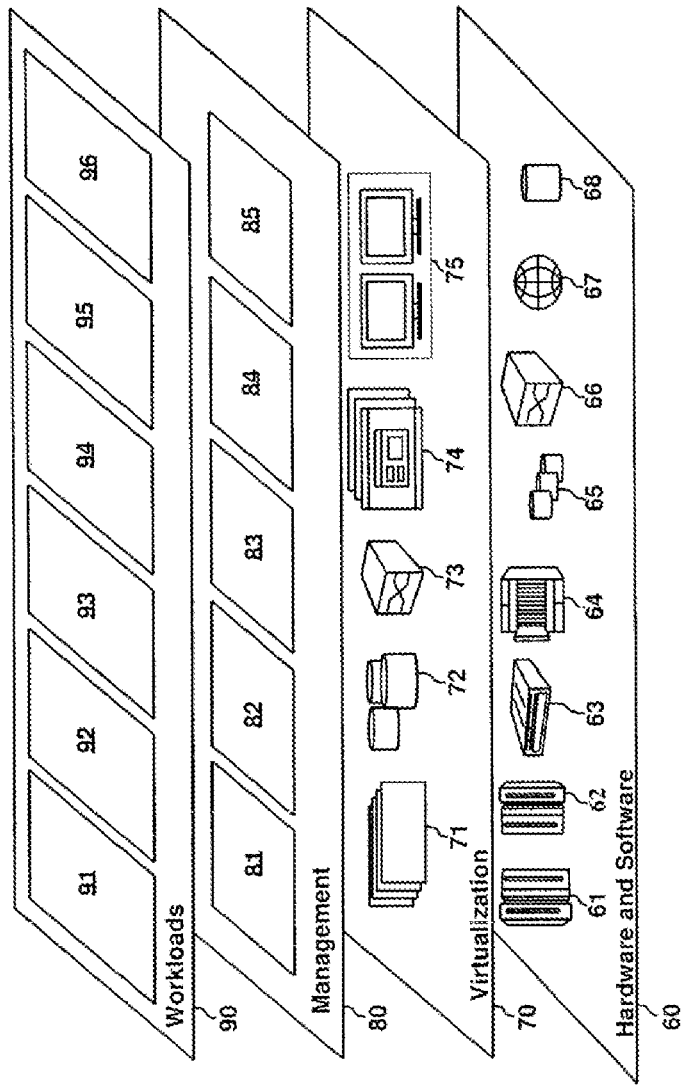
FIG. 8 depicts abstraction model layers according to an embodiment of the present disclosure.

In some embodiment, the method may continue with a user feedback step, at block 9 of FIG. 2. If the selected corpus appears to be correct, the keywords used have their weights increased by a configured amount (per area) in each of the configured areas. If the selected corpus was not correct, the weights are reduced by a configured amount (per area) in each of the configured areas, as depicted in FIG. 6. The feedback module 125 can provide that the user 10 selects a corpus 111 of keywords 111a, 111b, 111. The feedback module 125 also provide the user 10 the ability to add words with an add new keywords module 117. Following the user 10 selecting a corpus 111, the weights associated with the context keywords are decremented and/or incremented −/+ by a pre-configured amount. If the presented corpus 11 was selected by the user, then the weights associated with the context keywords are incremented by a pre-configured amount at the adjust keyword weights module 117. The new weights 119a, 119b, 199c are applied to the step of building the user profile 109 for the user that is described above with reference to block 4 of FIG. 2.

FIG. 3 is a block diagram illustrating a system 100 for providing context to a query made by a user to a chat bot. It is noted that each of the elements depicted in FIG. 3 of the context recognition system 100 are operatively coupled via a system bus 102. The context recognition system 100 may be integrated into the processing system 400 depicted in FIG. 4. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

The present invention may be a system, a method, and/or a computer program product at any possible technical detail level of integration. The computer program product may include a computer readable storage medium (or media), which may be non-transitory, having computer readable program instructions thereon for causing a processor to carry out aspects of the present invention.

In one example, a computer program product is described herein that provided context to user queries to a chat bot. In one embodiment, the method may include receiving a user query at a chat bot. The chat bot is communicating with a system providing conversation interaction with the user. The chat bot accessing a user profile being initiated by the user. The user can revoke the permission to the system for creating and/or using a user profile at any time. In some embodiments, the user profile includes a query history and profile information about the user that correlates keywords to context. The chat bot weighs query keywords for comparison with the keywords of the user profile that are correlated to context. The chat bot interacts with the user using the context correlated to the user in accordance with the weight of the query keywords matched to the keywords of the user profile that are correlated to the context.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method for an enhanced multi-work space chatbot (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for providing context to user queries to a chat bot, the method comprising:
   registering a user to a context recognition system that collects data from a data feed including text based communications, wherein natural language processing is employed to extracted terms from the data feed;
   creating a user profile with the context recognition system from a query history for the user that correlates the keywords from the query history and to context from the data feed, the context recognition system including a technology evaluator that assigns technology context weights from the extracted terms of the data feed for the keywords based upon technology, a job function evaluator that assigns job context weights for the extracted terms from the data feed to the keywords based upon a job function, and an industry evaluator that assigns industry context weights for extracted terms from the data feed to the keywords based upon industry, wherein the technology context weights, the job context weights and the industry context weights assigned to the keywords are stored in a context corpus;

receiving a user query at a chat bot providing a conversation interaction with the user, wherein the chat bot is communicating with the context recognition system, wherein terms from the query are matched to the keywords in the context corpus, the context of the query being provided from the context corpus of the context recognition system to the chat bot, wherein the keywords from the context corpus provided to the chat bot have highest weighted values for context from the technology context weights, the industry context weights and the job context weights from the context corpus; and answering the user query with the chat bot with an answer having keywords with the highest weighted values for context, wherein the keywords having the highest values for context have a higher impact on an answer to the user query than keywords having lower values for context.

2. The computer implemented method of claim 1, wherein the data feed to provide a user profile is selected from the group consisting of user text conversation, user organizational directory, user social media and combinations thereof.

3. The computer implemented method of claim 1, wherein the conversation interaction between the chat bot and the user is across an interface that employs a voice response system.

4. The computer implemented method of claim 1, wherein said creating the user profile includes providing keyword definitions for query terms for said user query.

5. The computer implemented method of claim 1, further comprising defining a sleep term, wherein when the user recites the sleep term, the context recognition system is bypassed in a process of answering the user query with the chat bot.

6. The computer implemented method of claim 1, wherein the user query is a question in text format or a question in voice format.

7. The computer implemented method of claim 1, further comprising a feedback step to include additional keywords to the user profile in response to user queries following the formation of the user profile.

8. A system for providing context for user queries to a chat bot, the system including memory for storing instructions to be executed by a processor, the system comprising:
a user registration interface for registering a user to a context recognition system that collects data from a data feed including text based communications, wherein natural language processing is employed to extracted terms from the data feed;
a user profile calculator including profile instructions stored on the memory and executed by the processor for creating a user profile with the context recognition system from a query history from the user that correlates the keywords from the query history and to context from the data feed, the context recognition system including a technology evaluator that assigns technology context weights from the extracted terms of the data feed for the keywords based upon technology, a job function evaluator that assigns job context weights for the extracted terms from the data feed to the keywords based upon a job function, and an industry evaluator that assigns industry context weights for extracted terms from the data feed to the keywords based upon industry, wherein the technology context weights, the job context weights and the industry context weights assigned to the keywords are stored in a context corpus;
an applicator of the user profiler for receiving a user query at a chat bot providing a conversation interaction with the user, wherein the applicator includes matching instructions stored on the memory and executed by the processor to provide that terms from the query are matched to the keywords in the context corpus, wherein the keywords from the context corpus provided to the chat bot have highest weighted values for context from the technology context weights, the industry context weights and the job context weights from the context corpus; and
a transmitter for sending the context provided by the applicator to the chat bot for answering the user query, wherein chat bot employs the context provided by the context recognition system to answer the user query, wherein the greater the weight of the keywords, wherein the keywords having a greatest weight have a higher impact on the answer to the user query.

9. The system of claim 8, further comprising a keyword definition database.

10. The system of claim 9, further comprising a receiver for the user query.

11. The system of claim 10, wherein query keywords from the receiver are assigned a weight for comparison with the keywords of the user profile that are correlated to the context.

12. The system of claim 11, wherein the chat bot interacts with the user using the context correlated to the user in accordance with the weight of the query keywords matched to the keywords of the user profile that are correlated to the context.

13. The system of claim 8, wherein data employed by the user profile calculator to provide a user profile is selected from the group consisting of user text conversation, user organizational director, user social media and combinations thereof.

14. The system of claim 8, further comprising a feedback module for adding keywords to the user profile in response to user queries following the formation of the user profile.

15. A computer program product including one or more non-transitory computer readable storage mediums collectively storing program instructions that are executable by a processor or programmable circuitry to cause the processor or programmable circuitry to perform operations comprising:
registering a user to a context recognition system that collects data from a data feed including text based communications; wherein natural language processing is employed to extract terms from the data feed;
creating a user profile with the context recognition system from a query history for the user that correlates the keywords from the query history and to context from the data feed, the context recognition system including a technology evaluator that assigns technology context weights from the extracted terms of the data feed for the keywords based upon technology, a job function evaluator that assigns job context weights for the extracted terms from the data feed to the keywords based upon a job function, and an industry evaluator that assigns industry context weights for extracted terms from the data feed to the keywords based upon industry, wherein the technology context weights, the job context weights and the industry context weights assigned to the keywords are stored in a context corpus;

receiving a user query at a chat bot providing a conversation interaction with the user, wherein the chat bot is communicating with the context recognition system, wherein terms from the query are matched to the keywords in the context corpus, the context of the query being provided from the context corpus of the context recognition system to the chat bot, wherein the keywords from the context corpus provided to the chat bot have highest weighted values for context from the technology context weights, the industry context weights and the job context weights from the context corpus; and answering the user query with the chat bot with an answer having keywords with the highest weighted values for context, wherein the keywords having the highest values for context have a higher impact on an answer to the user query than keywords having lower values for context.

16. The computer program product of claim 15, wherein the data to provide a user profile is selected from the group consisting of user text conversation, user organizational director, user social media and combinations thereof.

17. The computer program product of claim 15, wherein the conversation interaction between the chat bot and the user is across an interface that employs a voice response system.

18. The computer program product of claim 15, wherein said creating the user profile includes providing keyword definitions for query terms for said user query.

19. The computer program product of claim 15, further comprising defining a sleep term, wherein when the user recites the sleep term, the context recognition system is bypassed in a process of answering the user query with the chat bot.

20. The computer program product of claim 15, wherein the user query is a question in text format or a question in voice format.

* * * * *